[19] United States Patent
Varadhan et al.

(10) Patent No.: US 7,554,967 B1
(45) Date of Patent: Jun. 30, 2009

(54) TRANSIENT TUNNELING FOR DYNAMIC HOME ADDRESSING ON MOBILE HOSTS

(75) Inventors: Kannan Varadhan, Santa Clara, CA (US); Thomas F La Porta, Holmdel, NJ (US); Ramachandran Ramjee, Matawan, NJ (US); Luca Salgarelli, Hoboken, NJ (US); Sandra R Thuel, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 624 days.

(21) Appl. No.: 09/662,531

(22) Filed: Sep. 15, 2000

Related U.S. Application Data

(60) Provisional application No. 60/193,340, filed on Mar. 30, 2000.

(51) Int. Cl.
 *H04L 12/28* (2006.01)
(52) U.S. Cl. .................................. 370/352; 370/392
(58) Field of Classification Search ................. 370/310, 370/310.2, 313, 328, 329, 330, 331, 340, 370/341, 349, 392, 401, 409, 437, 466, 467; 455/432–440
 See application file for complete search history.

(56) References Cited

U.S. PATENT DOCUMENTS

| | | | | |
|---|---|---|---|---|
| 6,275,693 | B1 * | 8/2001 | Lin et al. .................. | 455/414.3 |
| 6,407,988 | B1 * | 6/2002 | Agraharam et al. ......... | 370/328 |
| 6,421,714 | B1 * | 7/2002 | Rai et al. ..................... | 709/217 |
| 6,484,211 | B2 * | 11/2002 | Turunen ...................... | 709/245 |
| 6,510,153 | B1 * | 1/2003 | Inoue et al. ................. | 370/354 |
| 6,535,493 | B1 * | 3/2003 | Lee et al. ..................... | 370/329 |
| 6,567,664 | B1 * | 5/2003 | Bergenwall et al. ......... | 455/403 |
| 6,587,882 | B1 * | 7/2003 | Inoue et al. ................. | 709/227 |
| 6,636,491 | B1 * | 10/2003 | Kari et al. ................... | 370/328 |
| 6,651,105 | B1 * | 11/2003 | Bhagwat et al. ............. | 709/239 |
| 6,654,607 | B1 * | 11/2003 | Shobatake et al. .......... | 455/433 |
| 6,707,809 | B1 * | 3/2004 | Warrier et al. .............. | 370/351 |

(Continued)

FOREIGN PATENT DOCUMENTS

WO WO 98/43446 1/1998

OTHER PUBLICATIONS

Droms, R., Dynamic Host Configuration Protocol, RFC2131 Draft Standard, Mar. 1997.

(Continued)

*Primary Examiner*—William Trost, IV
*Assistant Examiner*—Roberta A Shand

(57) ABSTRACT

Portable and/or mobile IP hosts desiring to connect to the Internet can dynamically acquire a home address and other configuration information through DHCP when powering up in a foreign network. A two-stage configuration procedure is used. First, the mobile host uses the M-IP protocol to establish contact with an addressing element, referred to as a bootstrapping agent, that is usually co-located with a M-IP Home Agent, and that allocates a temporary home address for the mobile host. The temporary address is used to create a temporary tunnel. Second, this temporary tunnel is used as the communication vehicle over which standard DHCP transactions take place. The present invention is thus arranged to use a) M-IP as the signaling mechanism for reaching the home network and dynamically allocating a temporary home address for the mobile host; and b) DHCP to allocate a permanent home address and any other configuration state for the mobile host.

11 Claims, 4 Drawing Sheets

U.S. PATENT DOCUMENTS

| | | | |
|---|---|---|---|
| 6,738,362 B1 * | 5/2004 | Xu et al. | 370/329 |
| 6,928,282 B2 * | 8/2005 | Taniguchi | 455/433 |
| 2001/0046223 A1 * | 11/2001 | Malki et al. | 370/338 |
| 2002/0143990 A1 * | 10/2002 | Turunen | 709/245 |

OTHER PUBLICATIONS

Alexander, S. et al., "DHCP Options and BOOTP vendor Extensions", RFC2132 Draft Standard, Mar. 1997.

Perkins, C., et al., "Using DHCP With Computers That Move", Wireless Networks J., vol. 1.

Vatn, J. et al., "The effect of Using co-located care-of address on macro handover latency", Proceedings of Nordic Teletraffic Seminar, Aug. 1998.

Vatn, J., "Long random wait-times for getting a care-of address are a danger to Mobile Multimedia", IEEE Intl. Workshop on Mobile Multimedia Communciations, pp. 142-144, Nov. 1999.

McAuley, A. et al., "Dynamic Registration and Configuration Protocol (DRCP)", http://search.ietf.org/internet-drafts/draft-itsumo-drcp-00.txt, Oct. 1999.

Perkins, C., "IP Mobility Support", RFC 2002 Draft Standard, Oct. 1996.

Perkins, C., "IP Encapsulation within IP", RFC 2003 Draft Standard Oct. 1996.

Perkins, C.E. et al.: :DHCP For Mobile Networking With TCP/IP, Proceedings IEEE International Symposium on Communications, Jun. 27, 1995, pp. 255-261, XP002132695.

* cited by examiner

PROCEDURE FOR MOBILE HOST POWER-UP AT ITS HOME NETWORK

TRANSIENT TUNNELING PROCEDURE FOR A MOBILE HOST POWER-UP IN A FOREIGN NETWORK

M-IP HA WITH A BOOTSTRAPPING AGENT REGISTRATION PROCEDURES

DE-REGISTRATION PROCEDURES

TRANSIENT TUNNELING FOR DYNAMIC HOME ADDRESSING ON MOBILE HOSTS

CROSS REFERENCE TO RELATED APPLICATION

This application claims priority of Provisional Application Ser. No. 60/193,340 which was filed on Mar. 30, 2000.

FIELD OF THE INVENTION

The present invention relates generally to portable and/or mobile communications, and more particularly, to a method for enabling a portable and/or mobile host, using the Mobile Internet Protocol (M-IP) to dynamically acquire a home address in a manner consistent with the Dynamic Host Configuration Protocol (DHCP) when powering up in a foreign network.

BACKGROUND OF THE INVENTION

As used in this disclosure, a host device, which may be a laptop computer, a personal digital assistant (PDA), a digital cellular telephone, or any other device adapted to perform two-way communication of information using the now well known Internet Protocol (IP), is considered to be "portable" when the device can be moved from one location to another, and operate at either location. A portable device does not have to operate WHILE it is being moved. On the other hand, a device is considered to be "mobile" when it can not only operate in different locations, but it can also operate WHILE it is being moved from location to location. If a device is adapted for mobile operation, it is, by definition, portable. Accordingly, in the following description, the use of the term "mobile host" will include both situations where the host is mobile (being moved) as well as where the host is in an area served by a foreign network.

Dynamic Host Configuration Protocol (DHCP) is the current dynamic addressing and configuration protocol in widespread use on the Internet. See R. Droms, *Dynamic Host Configuration Protocol*, RFC2131 Draft Standard, March 1997. DHCP not only enables hosts to acquire addresses but also other configuration options associated with the access network (e.g., netmask for subnet, domain name servers, directory servers, email servers, etc.) See S. Alexander and R. Droms, *DHCP Options and BOOTP vendor Extensions*, RFC2132 Draft Standard, March 1997. As emerging and future client applications increasingly rely on network services, the ability to dynamically configure these services through options becomes important. The DHCP protocol is a popular tool for today's service providers to manage their addressing needs.

While DHCP was originally intended for use with fixed hosts, it was a natural candidate to support dynamic addressing in the context of a host that would be portable and/or mobile. Since DHCP was designed for fixed hosts, its use on mobile hosts presented a number of challenges. Many of DHCP's limitations in supporting host mobility have been well documented in the literature, although none of such efforts have focused on dynamic home addressing which is the target of this invention. See, for example, Charles Perkins and Kevin Luo, *Using DHCP with Computers that Move*, Wireless Networks Journal, vol. 1, pp. 341-353, 1995; Jon-Olov Vatn and Gerald Maguire Jr., *The effect of using co-located care-of addresses on macro handover latency*, in Proceedings of Nordic Teletraffic Seminar, August 1998; Jon-Olov Vatn, *Long random wait-times for getting a care-of address are a danger to Mobile Multimedia*, IEEE Intl. Workshop on Mobile Multimedia Communications, pp. 142-144, November 1999; and A. McAuley, S. Das, S. Baba and Y. Shobatake, *Dynamic Registration and Configuration Protocol (DRCP)*, http://search.ietf.org/internet-drafts/draft-it-sumo-drcp-00.txt, October 1999.

In an attempt to enable seamless mobility of a host device while retaining Internet connectivity, the Mobile IP protocol (M-IP), as described by Charles Perkins in IP Mobility Support, RFC 2002 Draft Standard, October 1996, was developed. The prime goal of M-IP is to enable mobile hosts to get connected to the Internet and remain connected WHILE they move. This connectivity is preserved in a "transparent" manner, that is, in such a way that it prevents the disruption of networked applications running on the mobile host while it moves. To accomplish this goal, M-IP relies on the ability to configure the device's IP address to match that of the subnet onto which it is attached at any point in time, since having the correct address is needed to ensure that packets get routed to the host.

In M-IP, a mobile host has a fixed home address and acquires an additional care-of address (COA) that is updated as the host changes its location, called a "point of attachment". M-IP allows two options regarding the placement of a COA agent, also called the Foreign Agent (FA); the agent may be present inside the network (for example, at the base station) or as a co-located care-of address (CCOA) at the mobile host. While M-IP relies on the ability to configure the home and care-of addresses, it does not dictate how they are to be obtained.

In the early stages of M-IP design, portable and/or mobile hosts had fixed home addresses that were statically configured. Recently, the trend has shifted to a dynamic home addressing model, where a configuration protocol, which could be DHCP or some other protocol, enables these hosts to dynamically acquire and install a home address on power-up. Dynamic home addressing enables efficient management of addresses, which is critical in supporting wide-area wireless data users with millions of devices using the limited address space dictated by the IPv4 standard. It also provides ease of configurability, by replacing the burdensome task of manually configuring hosts with a more effective mechanism for address allocation. Note that the IPv6 standard removes address space limitations but it also stands to benefit from the configurability advantages awarded by dynamic addressing support.

One problem, however, that has been overlooked is that dynamic home addressing required when mobile hosts power up in a foreign network is not specified in the M-IP standard. Specifically, mobile hosts that power up in a foreign network with no home address cannot contact addressing servers in their home network through the type of "broadcasting" contemplated by DHCP. An alternative arrangement is needed that works, is compatible with DHCP and M-IP, and is easy to implement.

SUMMARY OF THE INVENTION

The present invention is a method called Transient Tunneling (TT) that allows configuring of portable and/or mobile IP hosts desiring to connect to the Internet, whereby such hosts can dynamically acquire a home address through DHCP when powering up in a foreign network. The method comprises a two-stage configuration procedure: First, the mobile host uses the M-IP protocol to establish contact with an addressing element, referred to as a bootstrapping agent, that is usually co-located with a M-IP Home Agent, and that allocates a temporary home address for the mobile host that is used to create a temporary tunnel; second, this temporary tunnel is used as the communication vehicle over which standard DHCP transactions take place. The present invention is thus arranged to use a) M-IP as the signaling mechanism for reaching the home network and triggering the acquisition of a temporary home address for the mobile host; and b) DHCP to allocate a permanent home address and any other configuration state for the mobile host.

The method of the present invention advantageously enables the use of conventional broadcasting procedures to properly discover an addressing server in their home network, and does not require changes to protocol standards. Only minor changes must be made to server implementations. The invention is simple to implement, avoids the problems that plague its alternatives, and exhibits acceptable performance. In addition, it leverages the growing DHCP code-base, with respect to its embedded support for important and often necessary host configuration options beyond addressing. While being DHCP-based, the method is potentially useful to any dynamic home addressing protocol that relies on broadcasting for server discovery.

BRIEF DESCRIPTION OF THE DRAWING

The present invention will be more fully appreciated from a consideration of the following Detailed Description, which should be read in light of the accompanying drawings in which.

DETAILED DESCRIPTION

Figure 1:
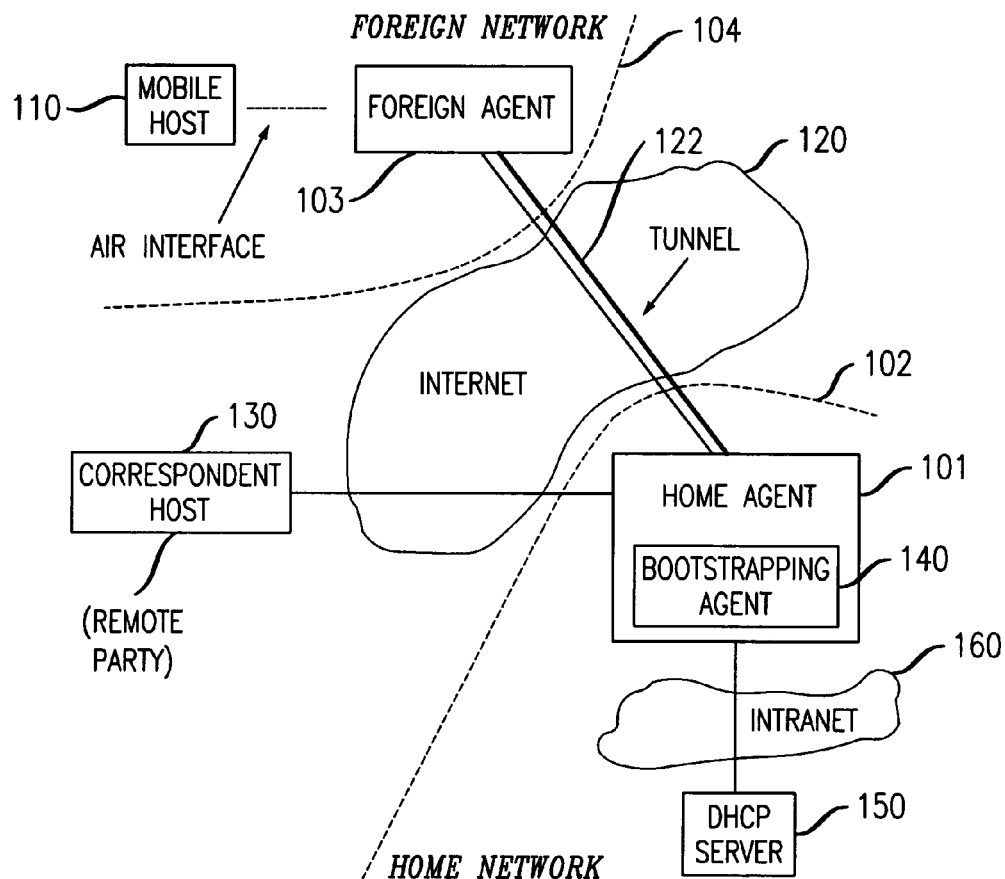
FIG. 1 is a block diagram illustrating the typical arrangement of home and foreign networks, showing the cooperation between a home agent (HA) 101 and a bootstrapping agent arranged in accordance with the present invention.

Before proceeding to describe the present invention, it will be helpful to briefly review Mobile IP and DHCP techniques, which are described in connection with FIG. 1, which is a high level block diagram showing the typical arrangement of home and foreign networks.

In a Mobile IP network there are two mobility agents: a home agent (HA) 101 and a foreign agent (FA) 103. Home agent 101 gives mobility support to hosts (such as mobile host 110) that belong to the same home network 102, while FA 103 serves hosts that are visiting from a foreign (remote home) network 104. Each mobile host must have a home address and must also acquire a care-of address (COA) when attached to a foreign network. The manner in which the COA is assigned depends on whether the FA resides on the host, i.e., the co-located or CCOA option, or on a device in the local access network. When an external FA is used, the COA becomes the address of one of its network interfaces. In the case of co-location, the host acquires a CCOA through static means or preferably through a dynamic addressing protocol like DHCP. The mobile host engages in two-way communication with a remote party, that shown in FIG. 1 as a corresponding host 130. In the description below, unless otherwise stated, we assume that the CCOA option of M-IP is used, because it is the more general of the two options. Most of the description below will apply to the network-based COA option as well. Where there are differences between the network-based (COA) option and the host based (CCOA) option, they are described below.

Packets sent to the mobile host 110 from a remote sender such as corresponding host 130 are always addressed to its home address. While the host is attached to its home network 101, packets reach it following conventional routing via the Internet 120. When the host moves into a foreign network 104, it acquires a COA and registers it with its home agent 101. Once registered, packets destined to its home address are routed as normal packets until they reach the home network 102, where the home agent 101 intercepts them. The home agent 101 encapsulates these packets to address them to the host's COA. Encapsulated packets are then routed as usual until they reach the host's foreign agent 103. These tunneled packets, transmitted through Internet 120 via a path that is often described as a tunnel (labeled 122 in FIG. 1)—are decapsulated (i.e., the COA is removed) by the foreign agent 103, and the original packet is forwarded to the mobile host 110. For details on "IP tunneling", see "IP Encapsulation within IP", Charles Perkins, RFC 2003 Draft Standard, October 1996. In the reverse direction, packets sent from the host 110 to corresponding host 130 (the remote party engaged in the call session), may optionally be reverse-tunneled, that is, encapsulated by the FA 103 and sent back to the home agent 101, which decapsulates and forwards them to the remote party. Each time the host 110 moves between points of attachment crossing a network or subnet boundary, it acquires a new care-of address and re-registers it with its home agent. Home agents associate a lifetime to the state they install for a host, requiring periodic lifetime renewals to avoid state expiration and removal.

Let us now turn our attention to DHCP. DHCP has a client-server architecture, in which a DHCP server 150 in FIG. 1 is accessible to a client on a mobile host via intranet 160, when the mobile host powers up in home network 102. A server manages a portion of the IP address space on a network by disbursing addresses and other configuration parameters to clients, such as name server addresses, on a request basis. A client running on a host allows it to dynamically acquire configuration state, replacing conventional static methods requiring manual intervention. If there are no servers on the same subnet to which the host is connected, a relay is introduced for forwarding client requests to servers on other subnets. Configuration parameters acquired by a client are leased, i.e., they have an associated expiration time, requiring periodic lease renewals to prevent lease expiration and configuration state removal.

Client-server communication takes place in the following manner. Packets destined to the server are always sent as IP broadcasts when the client does not know the address of a server. Otherwise, it may unicast its requests to the server's IP address (e.g., during a lease renewal). Packets destined to the client are usually sent as IP broadcasts, with two exceptions. First, if the client's request was forwarded from a relay, the server unicasts its response to the relay's IP address. The relay, in turn, broadcasts the packet on its subnet in order to reach the client. And second, if a particular flag in the DHCP packet header called the broadcast bit "B" bit is cleared, the server unicasts its replies to the client's hardware address, with the offered IP address in the destination field of the IP header. These rules have important implications for configuring a remote client.

In order to better understand the broadcasting problem that currently prevents a mobile host powering up remotely from using DHCP to dynamically acquire a home address needed to connect to the Internet, consider the following model: A mobile host relies on DHCP to dynamically configure both its home address and its co-located COA. This implies that clients running on the host must acquire and maintain leases on both addresses. Let us refer to the clients for the home address and for the CCOA as Hclient and Fclient, respectively.

Figure 2:
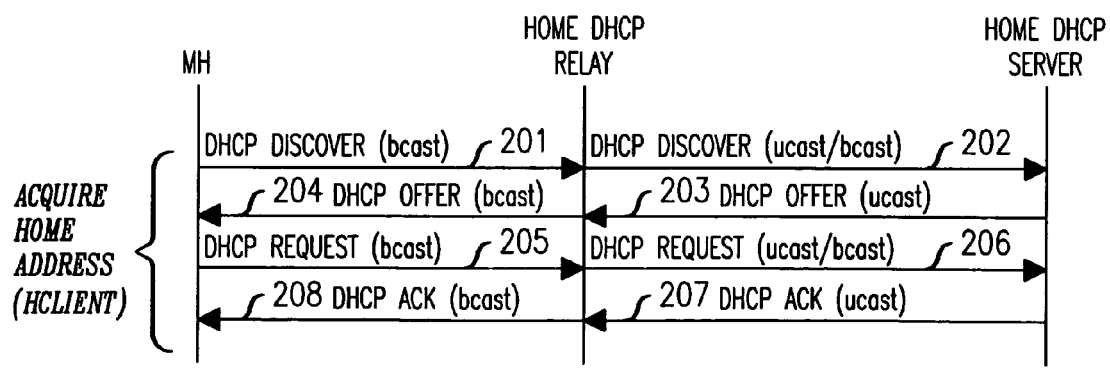
FIG. 2 is a diagram illustrating the standard DHCP messages that are exchanged for a mobile host to acquire a home address when it powers up in its home network and has no knowledge of an unexpired home address lease.

Assume a mobile host powers up in its home network with no knowledge of an unexpired home address lease. Since it needs to acquire one, it initiates the execution of Hclient, which must go through a full initialization (rather than a speedier reboot). FIG. 2 is a diagram that illustrates the standard addressing messages that are exchanged. Hclient attempts to contact a server by broadcasting a DISCOVER message (illustrated as rightward arrow 201 in FIG. 2 that originates from the mobile host) on its local subnet. This is actually a limited broadcast message since it is destined to address 255.255.255.255. The message is received by a server, or a relay on that subnet that is configured to forward the message (illustrated as rightward arrow 202 in FIG. 2) to a home DHCP server elsewhere on the home network (the scenario shown in FIG. 2 includes a home DHCP relay). When the message 202 reaches the server, it responds with an OFFER message (illustrated as leftward arrows 203 and 204 in FIG. 2) that it either broadcasts on its subnet or unicasts to the relay that had forwarded it. Whether through the relay or directly from the server, the mobile host receives the message 203, 204 as a limited broadcast. Hclient then broadcasts a REQUEST message (illustrated as rightward arrows 205 and 206 in FIG. 2), reaching the server directly or via the relay, as before. The server responds with an ACK message (illustrated as leftward arrows 207 and 208 in FIG. 2), confirming the granting of a lease. The ACK message 207, 208 reaches the host once again as a limited broadcast and Hclient concludes its lease acquisition by installing acquired state on the host's interface. Though not shown in FIG. 2, Hclient periodically enters the lease maintenance stage where it sends renewals to its home server. As per the M-IP standard, no M-IP registrations are needed while the host is in its home network.

Now let us consider the case where a host powers up in a foreign network. Once again, assume, without loss of generality, that the host holds no unexpired home address leases. If Hclient attempts to send a limited broadcast message in the hope of contacting a server that can grant it a home address, it will fail. Any upstream broadcast messages will be received by a local server or relay which may offer an address from its own lease pool, not that of the host's home network. Hclient needs a way to contact its remote home server, as standard broadcasting procedures will not enable a proper server discovery.

In brief, standard DHCP broadcasting procedures do not work for dynamic home addressing on mobile hosts that power up in a foreign network. Messages sent by a host client cannot reach a remote home server to acquire or renew a home address lease.

In order to bridge the gap between a mobile host powering up in a foreign network and its remote home DHCP server, the present invention uses the notion of an addressing agent, shown in FIG. 1 as a bootstrapping agent 140, for temporary home address allocation coupled with the assistance of M-IP. Basically, the present invention is arranged to use a) M-IP as the signaling mechanism for reaching the home network and triggering the acquisition of a temporary home address; b) a bootstrapping agent 140 cooperating with HA 101 in the home network to allocate a temporary home address for the host; and c) DHCP to allocate a permanent home address and any other configuration state for the host. Variations in the design of the addressing agent and its interaction with M-IP and DHCP are possible, and are discussed in detail below.

On power-up, the host must first determine whether it is in its home or in a foreign network. This location determination may be based on knowledge of its NAI, such as a user email address[1]. For example, a M-IP client on the host may listen for periodic advertisements from a home or foreign agent containing the domain name which it can then compare against its own NAI. If the host is in its home network, the process described above in connection with FIG. 2 is used. If the host is in a foreign network, the present invention is invoked, using the message flows illustrated in FIG. 3.

[1] A wireless link layer identifier such as the Mobile Identification Number (MIN) can be mapped to a NAI[10].

Figure 3:
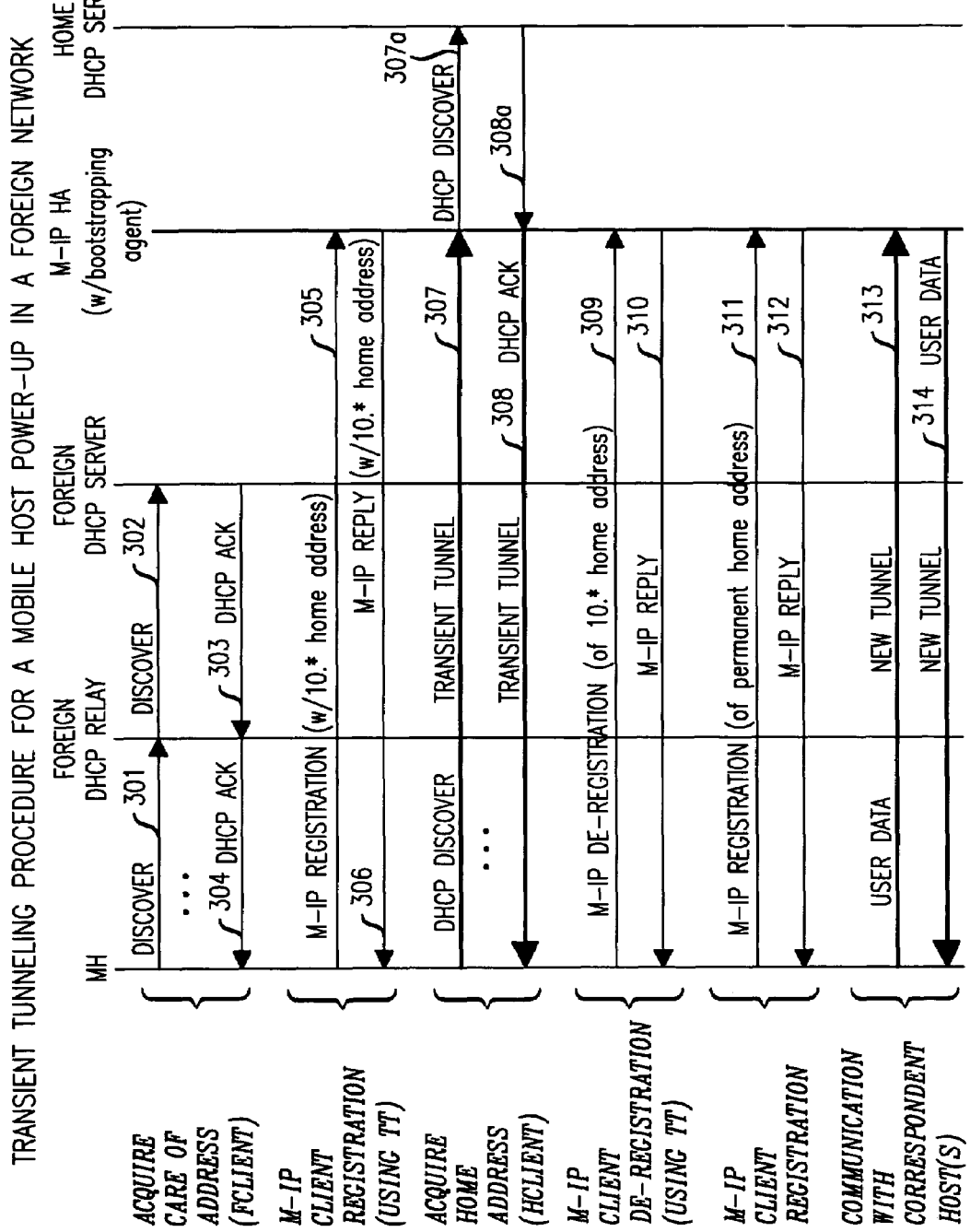
FIG. 3 is a diagram illustrating the messages that are exchanged when a mobile host powers up in a foreign network, in accordance with the arrangement of the present invention.

As shown in FIG. 3, the host first needs to acquire a co-located COA, so it spawns a DHCP client (Fclient). In accordance with standard M-IP processing, a DISCOVER message (illustrated as rightward arrows 301 and 302 in FIG. 3) is sent from the mobile host (MH in FIG. 3) to the foreign DHCP server, via a foreign DHCP relay. In response, an acknowledgement (ACK) message (illustrated as leftward arrows 303 and 304 in FIG. 3) is returned. Once the mobile host acquires the COA, it sends a unicast M-IP registration message (illustrated as rightward arrow 305 in FIG. 3) to its HA. It is here assumed that the address of the HA is known to the mobile host through static configuration or some other means such as dynamic home agent address resolution.[2] See Charles Perkins, IP Mobility Support, RFC 2002 Draft Standard, October 1996. The registration message contains the host's COA and its NAI, but no home address.

[2] Dynamic home agent address resolution requires the mobile host to know the broadcast address for its home subnet.

When the HA receives the registration message and notices that the home address is missing, it contacts bootstrapping agent 140 in FIG. 1 to acquire a temporary home address on behalf of the host. In one embodiment of our invention, bootstrapping agent 140, which can be thought of as a "lightweight addressing agent", is placed on the M-IP HA. However, it is to be noted here that bootstrapping agent 140 can also be located remotely from HA 101. In either event, bootstrapping agent 140 disburses temporary home addresses to the mobile host. This address pool may contain public, globally routable IP addresses or private IP addresses in the class 10.*. Drawing from a pool of private addresses is usually preferable when public addresses are scarce and must be used sparingly. Henceforth, we assume that the addressing pool consists of private addresses, although the transient tunneling procedure applies to either case. Once a 10.* address is assigned, the HA uses it to set up a tunnel to the COA of the host. The HA unicasts a registration reply message (illustrated as leftward arrow 306 in FIG. 3) containing the 10.* address back to the host. On receipt, the host sets up its end of the tunnel. Then Hclient is initialized on the host and launches a standard set of transactions needed to acquire a home address and other configuration options through the transient tunnel (highlighted with bold arrows in FIG. 3). All Hclient messages must be reverse tunneled through the HA to ensure that they are not received by any local DHCP servers or relays. Reverse tunneled messages are forwarded on the home subnet by the receiving HA, so that a home server or relay receives them. Similarly, replies sent by a home server or relay are tunneled to the remote host. Using this transient tunnel, Hclient can acquire an address (and other requested configuration state) from a home server without concerns about broadcasting.

The message flow in FIG. 3 in which the home address is acquired includes transmission of a DHCP request message 307 from Hclient to the HA 101 in FIG. 1, using tunneling; the extra address is stripped off at the HA, and the DHCP request message 307a is transmitted from the HA to the home DHCP server 150 in FIG. 1 via intranet 160. In the return direction, the address information is sent from the DHCP server to the HA in message 308a; at the HA, the extra address is added, and the message 308, including the desired address information, is transmitted to Hclient on mobile host 110 in FIG. 1 using tunnel 122 in FIG. 1.

After this bootstrapping phase, the 10.* address should be released[3], and its associated tunnel torn down and replaced with a tunnel terminating at the DHCP-granted permanent home address. This is accomplished by sending a M-IP de-registration message 309 from the host to the HA. An M-IP reply message 310 is then returned to the mobile host. Note that the Mobile IP tunnel associated with the 10.* address can also be allowed to time-out, instead of requiring the mobile host to send an explicit de-registration message (309) and wait for a reply (310).

[3] Alternatively, the 10.* address could have a short lease (in the order of 10 seconds) and be allowed to time-out.

Once the permanent home address is known to the mobile, a registration containing address can occur. This involves sending a message 311 with a permanent home address from the M-IP client to the HA, and receipt of an M-IP reply message 312 in return. Note that lease renewals may also be broadcast, since they are reverse-tunneled to the home network.

For this process just described to work, the broadcast bit options in DHCP and M-IP must be set. The broadcast "B" bit in the flags field of DHCP query messages must be set by the clients to ensure that the replies from the server or relay in the home network reach the client on the host while it is in the foreign network. Existing implementations of DHCP clients, such as on Microsoft Windows and ISC's implementation for UNIX always set the broadcast bit by default. By setting this bit, the client informs the server or relay to send any replies to the host as a broadcast using an IP broadcast address as the IP destination address and the link-layer broadcast address as the link-layer destination address. This ensures that the HA receives broadcast packets for subsequent forwarding to the host. The M-IP broadcast "B" bit in registration requests must also be set to ensure that the HA tunnels broadcast messages back to the host. A drawback in setting this bit is that the host may receive a flood of unwanted broadcast messages from its home network that are forwarded by its HA. This would result in a significant waste of wireless bandwidth. Strategies to address this issue are discussed below.

To summarize, transient tunneling as implemented in accordance with the present invention uses a bootstrapping addressing agent on the home agent to allocate private home addresses. This enables a temporary tunnel to be established to the host over which a standard, co-located DHCP client can acquire a lease from a pool of public (i.e., globally routable) home addresses. Once a home address is acquired, it is used to replace the temporary tunnel with a corresponding M-IP tunnel.

Note again here that the present invention is not needed for hosts powering up in their home network. However, power-ups in a foreign network, where it is applicable, are expected to be the more frequent case (e.g., use of M-IP for corporate access).

Figure 4:
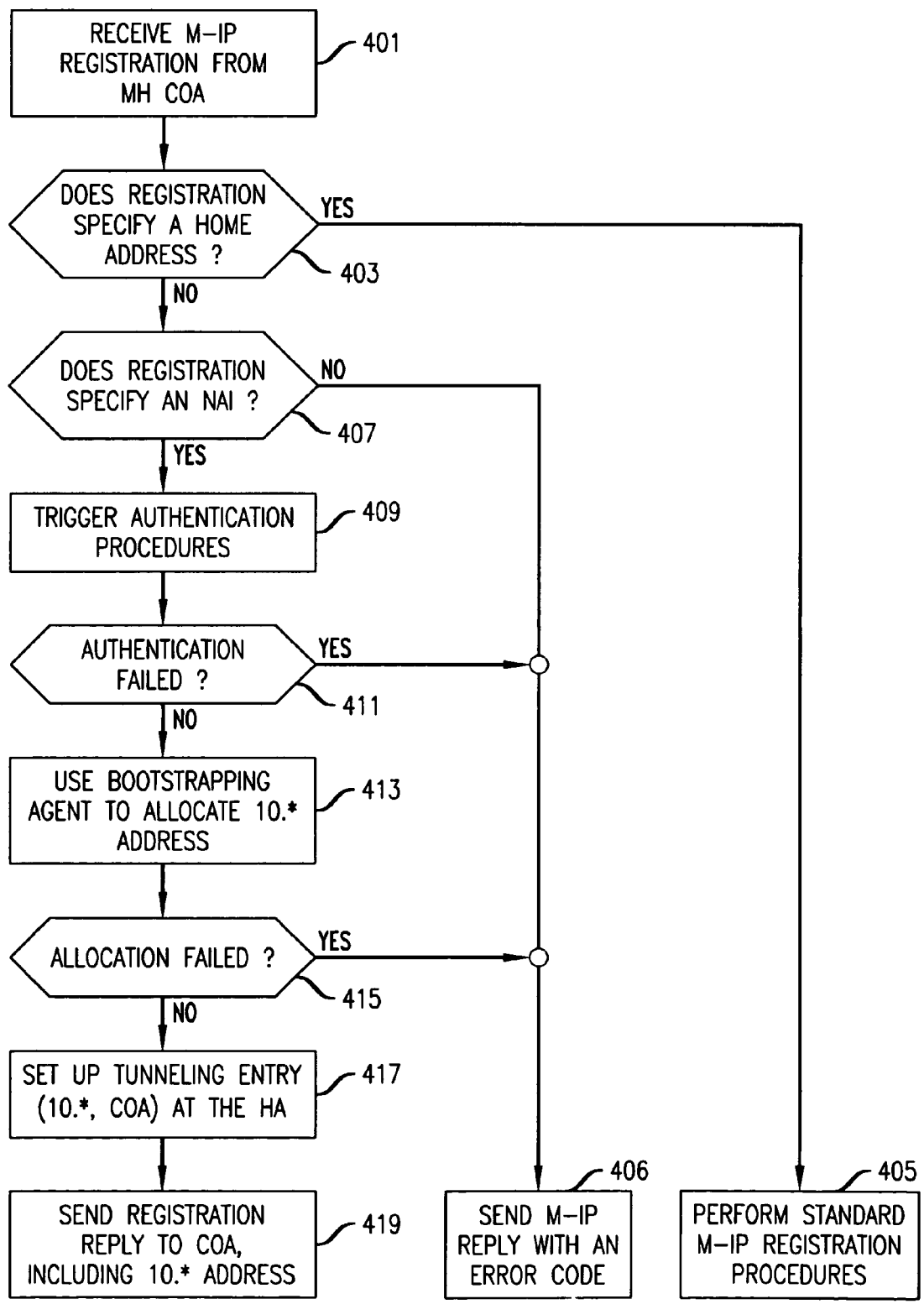
FIG. 4 is a flow diagram illustrating the registration process performed in a M-IP HA when arranged in accordance with the present invention to include a bootstrapping agent.

A flow diagram illustrating the registration process performed in HA 101 of FIG. 1 arranged in accordance with the present invention to work cooperatively with a bootstrapping agent 140, is shown in FIG. 4. The process is initiated in step 401, when a registration message (message 305 of FIG. 3) is received at HA 101 (FIG. 1) from MH 110 (FIG. 1). A determination is made in step 403 as to whether the registration message specifies a home address. This might occur, for example, if the mobile host 110 had already been provided with a static home address. If so, a YES result occurs, and the process proceeds to step 405, in which a standard registration procedure is performed.

If a NO result occurs in step 403, the process continues to step 407 to determine if the registration request includes a network access indicator (NAI). If not, a NO result occurs, and the process terminates in step 406, in which a error code is returned to MH 110 using the M-IP protocol. If an NAI is present, authentication procedures are initiated in step 409, and the process determines, in step 411, if authentication was successful for the NAI determined to be present in step 407. If not, a YES result occurs in step 411, and the process again proceeds to step 406. If authentication occurs, bootstrapping agent 140 (FIG. 1) is used, in step 413, to temporarily allocate a 10.* address to MH 110. A determination of the success of the allocation process is made in step 415. If the process fails (for any possible reason), a YES result occurs in step 415, and the process terminates with step 406. Otherwise, a NO result occurs in step 415, and a tunneling entry (using the 10.* address as a COA) is then set up at HA 101 in step 417. The registration process is complete when HA 101 returns a registration reply (message 306 of FIG. 3) to MH 110 using the COA, and including the 10.* address.

Figure 5:
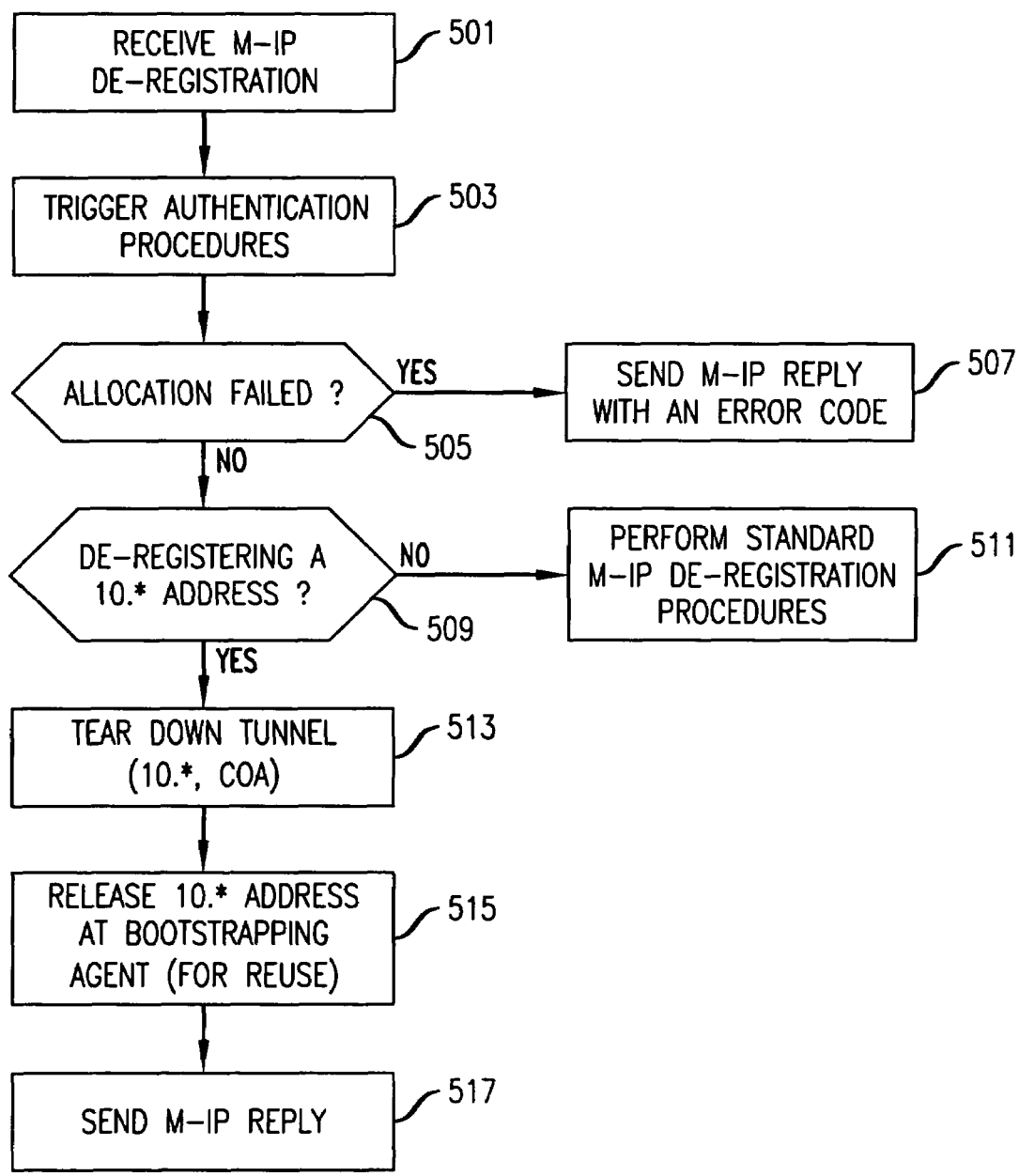
FIG. 5 is a flow diagram illustrating the de-registration process performed in a M-IP HA arranged in accordance with the present invention to include a bootstrapping agent.

A flow diagram illustrating the de-registration process performed in HA 101 (FIG. 1) together with bootstrapping agent 140 (FIG. 1) is shown in FIG. 5. The process is initiated in step 501, when a de-registration message (message 309 of FIG. 3) is received from MH 110 in HA 101. This message triggers an authentication procedure in step 503. If it is determined in step 505 that the authentication failed, a YES result occurs, and a error code message is sent to the MH using the M-IP protocol. If the authentication is successful, the process continues to step 509, in which a determination is made as to whether the de-registration relates to an address in the 10.* format. If not, a NO result occurs in step 509, and the conventional or standard de-registration procedure is performed in step 511. Alternatively, if the result of step 509 is YES, the tunnel previously established in step 417 of FIG. 4 is torn down in step 513, and in step 515 bootstrapping agent 140 releases for re-use the 10.* address allocated in step 413 of FIG. 4. A reply (message 310 in FIG. 3) is sent from HA 101 (FIG. 1) to MH 110 in step 517, indicating that the de-registration process has been completed.

The present invention can be modified, if desired, to make more efficient use of wireless bandwidth. This modification is practical and useful, since mobile hosts usually connect to an IP access network through a wireless air link, where bandwidth tends to be limited and costly due to physical and regulatory constraints. As a result, practical mobility solutions should be concerned with the effective use of air bandwidth. Typical approaches to address this concern are packet compression techniques and the reduction of over-the-air traffic. We focus on the latter approach.

Traffic over-the-air may be reduced through the prevention of bandwidth waste. One way to prevent bandwidth waste in the transient tunneling process of the present invention is to stop unwanted broadcast packets originating in the home network from being tunneled to the mobile host by its HA. Recall from previous description that a broadcasting bit needs to be set in the HA so that DHCP packets broadcast by a server or relay in the home network reach the host in a foreign network. Unfortunately, all broadcast packets will be forwarded when the transient tunnel is present, not just the few desired DHCP packets. This introduces a costly traffic burden, especially over low bit-rate wireless links. We now describe an approach to eliminate this undesirable broadcast traffic overhead.

In the "co-located relay" approach, the DHCP client is modified to mimic the operation of a joint client and relay. By sending messages to the server as if they were passing through a relay, the server is tricked into responding with IP unicast messages, thus eliminating the need for the HA to forward any broadcast packets downstream. The co-located relay (i.e., the relay at the mobile host) is arranged to use the private (temporary) home address of the host acquired through transient tunneling process of FIG. 4 as its IP address, and advertise it to the home DHCP server in the 'giaddr' field of messages 307 and 307a of FIG. 3. It should be noted that address assignment rules used by the DHCP server to decide which address to assign to an incoming request are not standardized. Server implementations often select an address on the subnet where the relay resides, if the request was relayed, or on the subnet associated with the server's interface on which the request was received. This may result in an undesirable address assignment for transient tunneling, entailing possible implementation-dependent changes to the server's subnet selection rules. When the DHCP server receives the DHCP request (message 307a of FIG. 3), and notices that the 'giaddr' field is populated, it responds with a unicast message (message 308a in FIG. 3) destined to the private home address specified in the 'giaddr' field. This message is intercepted by the HA, and tunneled to the COA using the tunnel set up using the process of FIG. 4. When the mobile host receives the DHCP reply (message 308 of FIG. 3) it is processed through this virtual relay to eliminate relay state (i.e., clear 'giaddr' field) and hand it off to the client for normal processing. This approach to bandwidth conservation hinges on the fact that transient tunneling assigns a private (temporary) home address that can be used to simulate DHCP relay functionality for acquiring the home address. A shortcoming of this approach is that it requires a server to be on the same subnet as the HA, because a relayed DHCP request cannot go through more than one relay on its way to a server.

As indicated previously, the description of the transient tunneling process assumed that the FA is co-located with the mobile host. However, in some instances, it is necessary or desirable to use an external foreign agent. If this is done, the transient tunneling process shown in FIG. 3 is slightly different. First, the mobile host acquires a COA from an external foreign agent, rather than from a DHCP server as shown in messages 301 through 304. Second, the mobile IP registration message is sent by the client on the mobile host to the external foreign agent (not directly to the home agent, as shown by message 305 in FIG. 3). The external foreign agent forwards the registration message to the HA. In the reverse direction, the HA replies to the external foreign agent with the 10.* home address, which is used by the external foreign agent to set up its end of the transient tunnel. Thus, a third difference in this arrangement is that, unlike what is shown in FIG. 3, the transient tunnel extends between the external foreign agent (not the mobile host) and the HA. After the transient tunnel is set up, the foreign agent forwards the registration reply message to the client on the mobile host. Finally, it is to be noted that when an external foreign agent is used, the de-registration process shown in FIG. 3 is also slightly different, in a manner similar to that just described.

The use of private home addressing with M-IP raises the possibility of host address collisions at the external foreign agent. Since by definition private addresses are not globally unique, it is possible than an overlap occurs between the private addresses of hosts belonging to different HAs but served by the same FA. To resolve such addressing conflicts and ensure proper routing to the hosts, the FA can use additional host configuration state, such as the HA address. Persons skilled in the art will have various available mechanisms for resolving these addressing conflicts.

What is claimed is:

1. A method for configuring a portable and/or mobile host that powers up in a foreign network to connect to the Internet, comprising the steps of creating a bootstrapping agent in the home network that works cooperatively with a Mobile IP home agent to initially allocate a temporary home address to said portable and/or mobile host that powers up in the foreign network, the portable and/or mobile host using the Mobile IP protocol to contact said Mobile IP home agent and request said bootstrapping agent to allocate said temporary home address to said portable and/or mobile host while the mobile host is in the foreign network;

using in the foreign network, said temporary home address to create a temporary tunnel between a foreign agent associated with said portable and/or mobile host and said Mobile IP home agent, wherein said temporary tunnel is used to communicate configuration information including a permanent home address allocated by a Dynamic Host Configuration Protocol (DCHP) server between the portable and/or mobile host and its home network, when the portable and/or mobile host powers up in the foreign network, thereby allowing the portable and/or mobile host that powers up in a foreign network to connect to the Internet; and replacing said temporary tunnel with a new tunnel between said mobile IP home agent and said foreign agent using said permanent home address, thereby allowing a mobile host without an IP home address to connect to the Internet when powering up in the foreign network.

2. The method of claim 1 wherein said foreign agent is co-located with said mobile host.

3. The method of claim 1 wherein said foreign agent is located on a device that is external to said mobile host and resides in said foreign network.

4. The method of claim 1 wherein said bootstrapping agent is arranged to assign IP addresses from an address pool of private addresses.

5. The method of claim 4 wherein private addresses are in the format 10*.

6. The method of claim 1 wherein said bootstrapping agent is arranged to assign IP addresses from an address pool of public addresses.

7. The method of claim 1 wherein a DHCP client located on said portable and/or mobile host is used to generate messages requesting said configuration information from the DHCP server via said temporary tunnel.

8. The method of claim 7 wherein said messages generated by said DHCP client are modified at said portable and/or mobile host to have a format consistent with a DHCP relay.

9. A method for enabling a mobile host without an IP home address while in a foreign network, to connect to the Internet when powering up in the foreign network, comprising the steps of:

obtaining a temporary IP home address for said mobile host powering up in the foreign network without an IP home address from a temporary IP address source accessible through a bootstrapping agent that works cooperatively with a mobile IP home agent, establishing a transient tunnel between said mobile IP home agent and a mobile IP foreign agent associated with said mobile host while the mobile host is in said foreign network, using said temporary IP home address, acquiring, via said transient tunnel, configuration parameters including a permanent IP home address from a Dynamic Host Configuration Protocol (DHCP) server located in the home network of said mobile host, and replacing said transient tunnel with a new tunnel between said mobile IP home agent and said mobile IP foreign agent using said permanent IP home address, thereby allowing a mobile host without an IP home address to connect to the Internet when powering up in the foreign network.

10. A method for configuring a mobile host that powers up in a foreign network, comprising:

setting up a temporary IP tunnel via the Mobile IP protocol to connect said mobile host to its home network while the mobile host is in the foreign network, using an IP broadcasting protocol over said temporary IP tunnel so that said mobile host can discover a Dynamic Host Configuration Protocol (DHCP) addressing server in its home network;

using the DHCP protocol to communicate addressing and configuration information between said addressing server and said mobile host while the mobile host is in the foreign network; and replacing said temporary IP tunnel with a new tunnel, thereby allowing a mobile host without an IP home address to connect to the Internet when powering up in the foreign network.

11. In a system arranged to use an IP tunnel to relay via the Internet communication packets that are destined to a mobile host from a home server in said host's home network to a foreign server when said host is in a foreign network, wherein the establishment of said IP tunnel requires said home server and foreign server to know a permanent IP home address of said mobile host, a method for configuring said mobile host when it powers up in said foreign network without said IP home address, comprising the steps of obtaining a temporary IP home address for said mobile host from an IP address source accessible thorough said home server, establishing a transient tunnel between said home server and said foreign server using said temporary IP home address while the host is in the foreign network, acquiring, via said transient tunnel, permanent configuration parameters including the permanent IP home address from a DHCP server located in a region served by said home server while the host is in the foreign network, replacing said transient tunnel with a new tunnel between said home server and said foreign server using said permanent IP home address.

\* \* \* \* \*